(12) United States Patent
Kirichun et al.

(10) Patent No.: US 12,208,966 B2
(45) Date of Patent: Jan. 28, 2025

(54) FLIGHTED CONVEYOR INSERT FOR ROBOTIC PICKING OF FOOD PRODUCTS AND FLIGHTED CONVEYOR HAVING THE INSERT

(71) Applicant: F.R. DRAKE COMPANY, Waynesboro, VA (US)

(72) Inventors: Maksim Kirichun, Bridgewater, VA (US); Miguel Negre, Charlottesville, VA (US); Andre G Richards, Charlottesville, VA (US)

(73) Assignee: F.R. DRAKE COMPANY, Waynesboro, VA (US)

( * ) Notice: Subject to any disclaimer, the term of this patent is extended or adjusted under 35 U.S.C. 154(b) by 90 days.

(21) Appl. No.: 18/139,068

(22) Filed: Apr. 25, 2023

(65) Prior Publication Data
US 2023/0356954 A1 Nov. 9, 2023

Related U.S. Application Data

(60) Provisional application No. 63/338,095, filed on May 4, 2022.

(51) Int. Cl.
*B65G 19/26* (2006.01)
*B65G 15/44* (2006.01)
(Continued)

(52) U.S. Cl.
CPC ........... *B65G 19/265* (2013.01); *B65G 15/44* (2013.01); *B65G 19/08* (2013.01); *B65G 19/185* (2013.01);
(Continued)

(58) Field of Classification Search
CPC ...... B65G 19/265; B65G 15/44; B65G 19/08; B65G 19/185; B65G 2201/0202; B65G 2812/02772; B65G 15/42
See application file for complete search history.

(56) References Cited

U.S. PATENT DOCUMENTS 1,339,646 A * 5/1920 Frey ...................... B65G 15/42
198/834
4,723,652 A 2/1988 Rich
(Continued)

FOREIGN PATENT DOCUMENTS

CN 207684311 8/2018
EP 1 357 526 A2 10/2003
(Continued)

OTHER PUBLICATIONS

Extended European Search Report issued Oct. 4, 2023 in corresponding European Patent Application No. 23171325.6.

*Primary Examiner* — Mark A Deuble
(74) *Attorney, Agent, or Firm* — Crowell & Moring LLP

(57) ABSTRACT

The present disclosure is directed to a flighted conveyor insert for robotic picking of food products and a flighted conveyor having the same. In one forth, an insert for a flighted conveyor, such as a bucket chain, defines a forward edge configured for insertion through an aperture of a flight of the flighted conveyor such that when the insert is attached to the flight, the forward edge is positioned on a first side of the flight; and a rear edge configured such that when the insert is attached to the flight, the rear edge is positioned on a second side of the flight that is oppose to the first side of the flight.

10 Claims, 6 Drawing Sheets

(51) Int. Cl.
*B65G 19/08* (2006.01)
*B65G 19/18* (2006.01)

(52) U.S. Cl.
CPC ............... *B65G 2201/0202* (2013.01); *B65G 2812/02772* (2013.01)

(56) References Cited

U.S. PATENT DOCUMENTS

| | | | | |
|---|---|---|---|---|
| 4,946,026 | A * | 8/1990 | Rickman | B65G 45/12 198/716 |
| 6,467,610 | B1 * | 10/2002 | MacLachlan | B65G 17/32 198/853 |
| 6,554,129 | B2 * | 4/2003 | Straight | B65G 17/32 198/801 |
| 6,695,135 | B1 * | 2/2004 | Lapeyre | B65G 17/08 198/853 |
| 7,267,222 | B2 * | 9/2007 | Montemartini | B65G 17/40 198/853 |
| 7,360,640 | B2 * | 4/2008 | Cash, III | B65G 15/42 198/851 |
| 8,567,593 | B2 * | 10/2013 | Nakamura | B65G 15/44 198/699.1 |

FOREIGN PATENT DOCUMENTS

| | | | |
|---|---|---|---|
| EP | 1 357 526 A3 | 10/2003 | |
| JP | 53-78183 | 6/1978 | |
| WO | WO 99/32377 | 7/1999 | |
| WO | WO-2007088774 A1 * | 8/2007 | ............. B65G 15/42 |
| WO | WO 2019/235632 | 12/2019 | |

* cited by examiner

FLIGHTED CONVEYOR INSERT FOR ROBOTIC PICKING OF FOOD PRODUCTS AND FLIGHTED CONVEYOR HAVING THE INSERT

RELATED APPLICATIONS

The present application claims priority to U.S. Provisional Patent Application No. 63/338,095, filed May 4, 2022, the entirety of which is hereby incorporated by reference.

FIELD OF THE DISCLOSURE

The present disclosure relates to inserts for a flighted conveyor, such as a bucket chain, used in a machine that utilizes robotic picks in the movement and placement of tubular food products and the like, such as sausages, frankfurters, etc. The inserts described below provide the ability to centrally position cylindrical or tubular food products, such as sausages, within a flighted conveyor, such as a bucket chain, of a food handling machine.

BACKGROUND OF THE DISCLOSURE

Part of a process for a movement and placement of tubular food products, such sausages, into a packaging machine is to orderly sort and separate the tubular food products. One commonly used method is to place individual sausages into a flighted conveyor, such as a bucket chain. Since makers of sausages typically have a wide range of sausage sizes that they produce, it is desirable to be able to do the sorting with a common flighted conveyor because changing a flighted conveyor with flights specifically designed for different sized tubular food products can be time consuming. However, when there is a broad range of diameters of tubular food products, such as sausages, within a product matrix, the smaller diameter products may be loose within the flighted conveyor because the spacing of the flights on the conveyor are typically designed based on a largest diameter food product of the product matrix.

The looseness of food products of smaller diameters between adjacent flights causes issues when a robot tool, commonly equipped with suction cups, approaches the sausage to pick it from between adjacent flights of the flighted conveyor. Should the small diameter sausage be located off center within adjacent flights of the conveyor, it becomes likely that the suction cup of the robot tool will not make a good seal with the food product and therefore not pick up the food product. Missing a pick-up of the food product is undesirable because it decreases the efficiency of the production line.

SUMMARY OF THE DISCLOSURE

The present disclosure is directed to an insert that is inserted through a flight of a flighted conveyor such as a bucket chain conveyor. This configuration of an insert inserted through a flight positions undersized tubular food products, such as a sausage, centrally between two adjacent flights in the flighted conveyor to provide consistent positioning for picking of the tubular food product by a robot tool while minimizing a number of missed picks.

The present disclosure is also directed to a flighted conveyor, such as a bucket chain conveyor, that includes the inserts secured to flights of the conveyor.

In one form, an insert for a flighted conveyor is disclosed. In some implementations, an insert for a flighted conveyor defines a forward edge configured for insertion through an aperture of a flight of the flighted conveyor such that when the insert is attached to the flight, the forward edge is positioned on a first side of the flight; and a rear edge configured such that when the insert is attached to the flight, the rear edge is positioned on a second side of the flight that is opposite to the first side of the flight.

In another form, a flighted conveyor is disclosed. In some implementations, a flighted conveyor comprises a plurality of flights, the flights of the plurality of flights spaced apart from each other along the flighted conveyor; a plurality of inserts, each insert attached to a flight of the plurality of flights, where each insert comprises: a forward edge configured for insertion through an aperture of a flight such that when the insert is attached to the flight, the forward edge is positioned on a first side of the flight; and a rear edge configured such that when the insert is attached to the flight, the rear edge is positioned on a second side of the flight that is opposite to the first side of the flight, where between a first flight and a second flight of the plurality of flights that are adjacent to each other, a forward edge of an insert attached to the first flight and a rear edge of an insert attached to the second flight are positioned to substantially center a cylindrical product positioned between the first and second flights.

DETAILED DESCRIPTION

Figure 1:
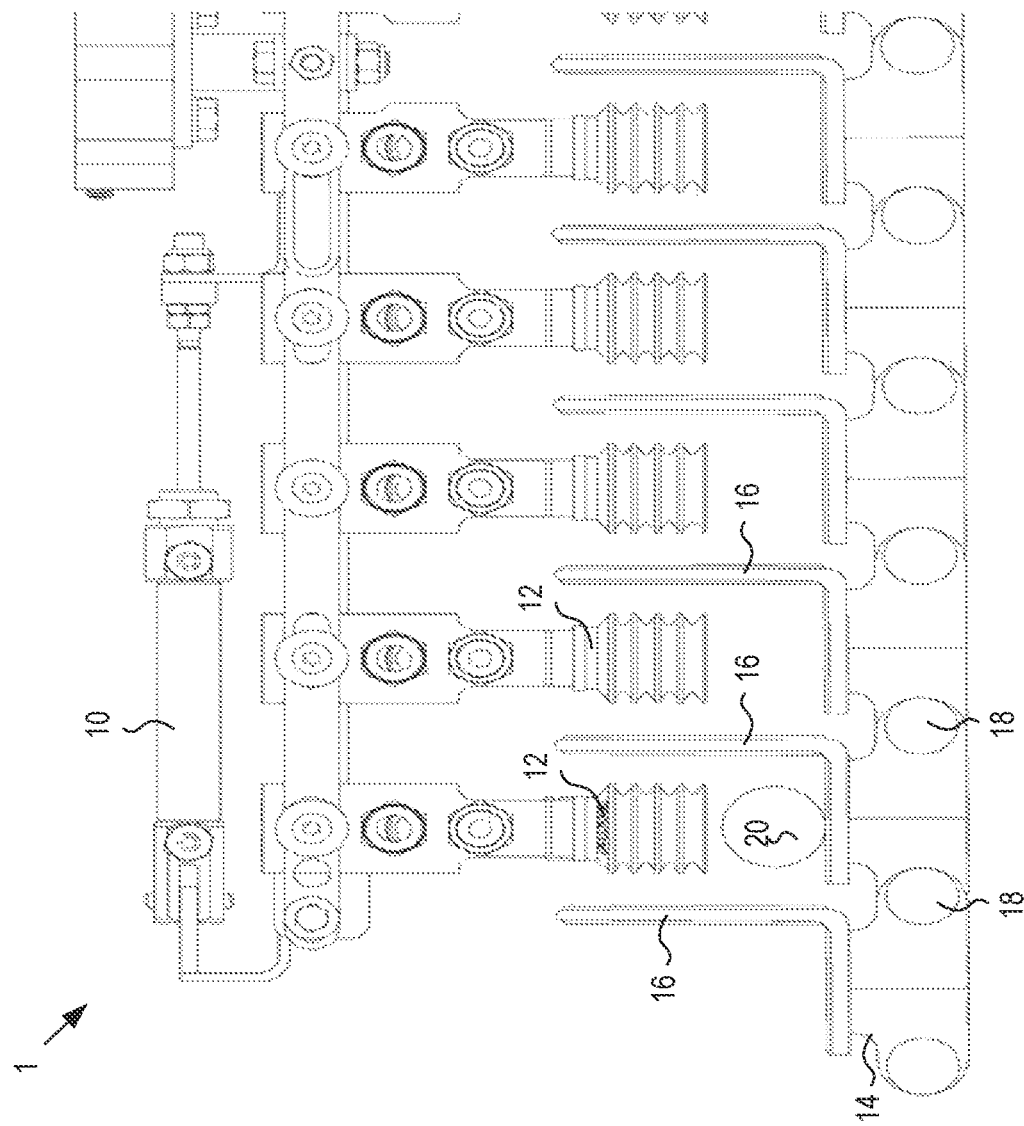
FIG. 1 illustrates a side view of a flighted conveyor with a sausage positioned in a center of a flight.

FIG. 1 depicts a side view of a flighted conveyor with a sausage positioned at a center of a flight and a robot tool with suction cups in a position representing a pick approach for the sausage.

A food handling machine 1, as shown in FIG. 1, may include a pick-and-place robot 10 that is connected to a suitable vacuum system (not show). Once example of a food handling machine 1 with a pick-and-place robot 10 such as this is described in U.S. Pat. No. 10,207,830, the entirety of which is hereby incorporated by reference. Implementations of a food handling machine 1 such as those of the present disclosure also include a flighted conveyor 14, such as a bucket chain conveyor, that is positioned below a plurality of suction cups 12 of a pick-and-place robot 10.

The bucket chain conveyor 14 includes a plurality of interconnected flights 16 that articulate and provide a chain for the bucket chain conveyor 14. The flights 16 are connected at joints 18 that allow the flights 16 to pivot relative to each other as they are advanced by a motor system (not shown) of the food handling machine 1. Tubular food products 20, such as sausages, are positioned on a base of a flight 16 and between two adjacent flights of the bucket chain conveyor 14. The flights 16 advance during operation so as to place the tubular food products 20 underneath suction cups 12 of the pick-and-place robot 10.

During operation, as the bucket chain conveyor 14 advances, the pick-and-place robot 10 moves downward such that the plurality of suction cups 12 engage the tubular food products 20 positioned on the flights 16. Due to the vacuum system connected to the pick-and-place robot 10, when the suction cups 12 engage the food products 20, the food products 20 are secured to the suction cups 12 and the pick-and-place robot 10 may move upward to remove the tubular food products 20 from the flights 16 for further processing. For example, the pick-and-place robot 10 may place the tubular food products 20 into packaging.

Figure 2:
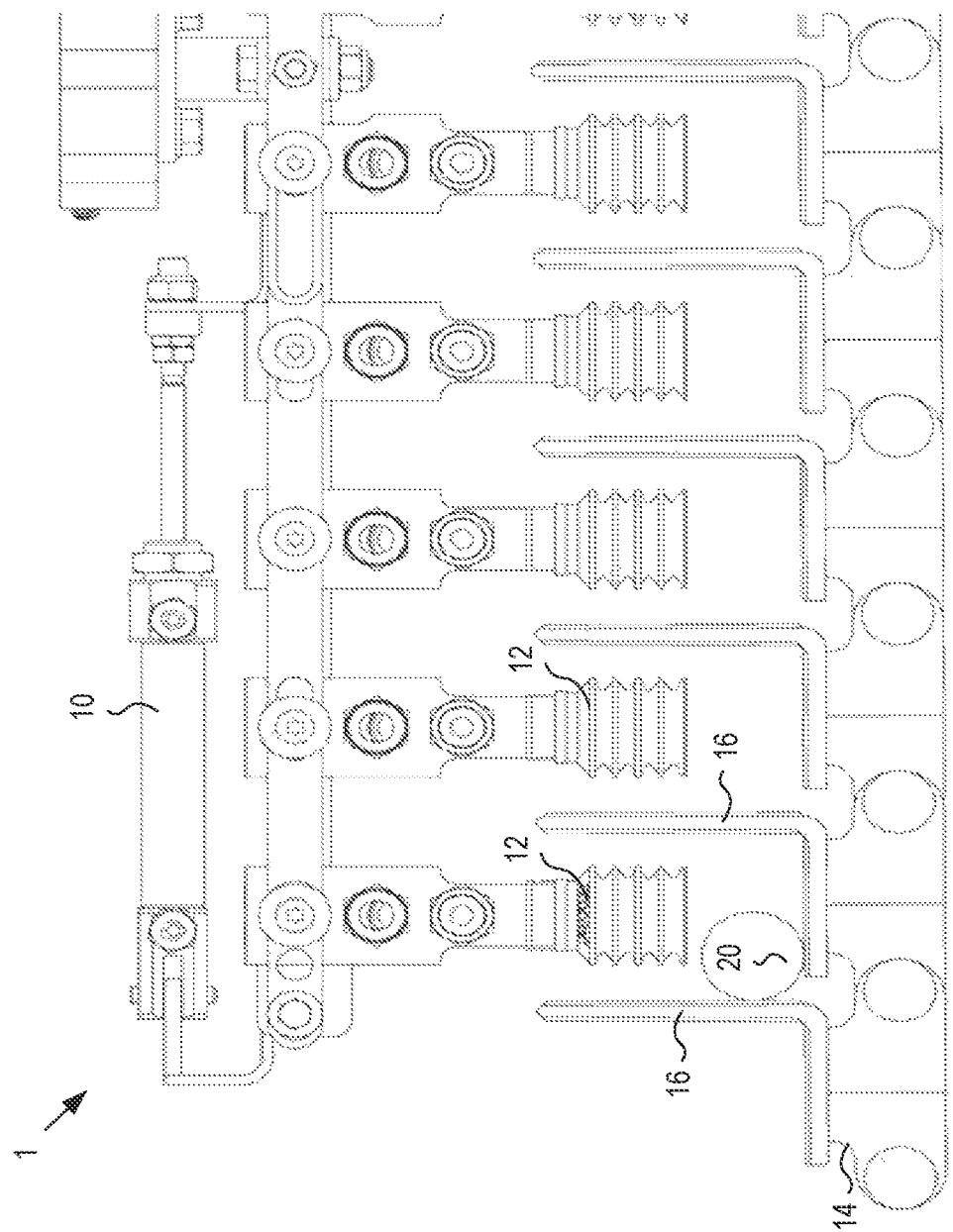
FIG. 2 illustrates a side view of a flighted conveyor with a sausage that is positioned on a side of the flight.

FIG. 2 depicts a side view of a flighted conveyor with a sausage that is positioned on a side of the flight. As shown in FIG. 2, when the food product 20 is positioned on a base of a flight and between two adjacent flights 16, a tubular food product may have a small enough diameter to allow it to be positioned to a side of the area between two adjacent flights 16 and not centered under a suction cup 12 of the pick-and-place robot 10. As a result, the tubular food product 20 is not oriented to make a good seal with suction cup 12, thereby preventing the tubular food product 20 from securing against the suction 12 for removal from the bucket chain conveyor 15.

Figure 3:
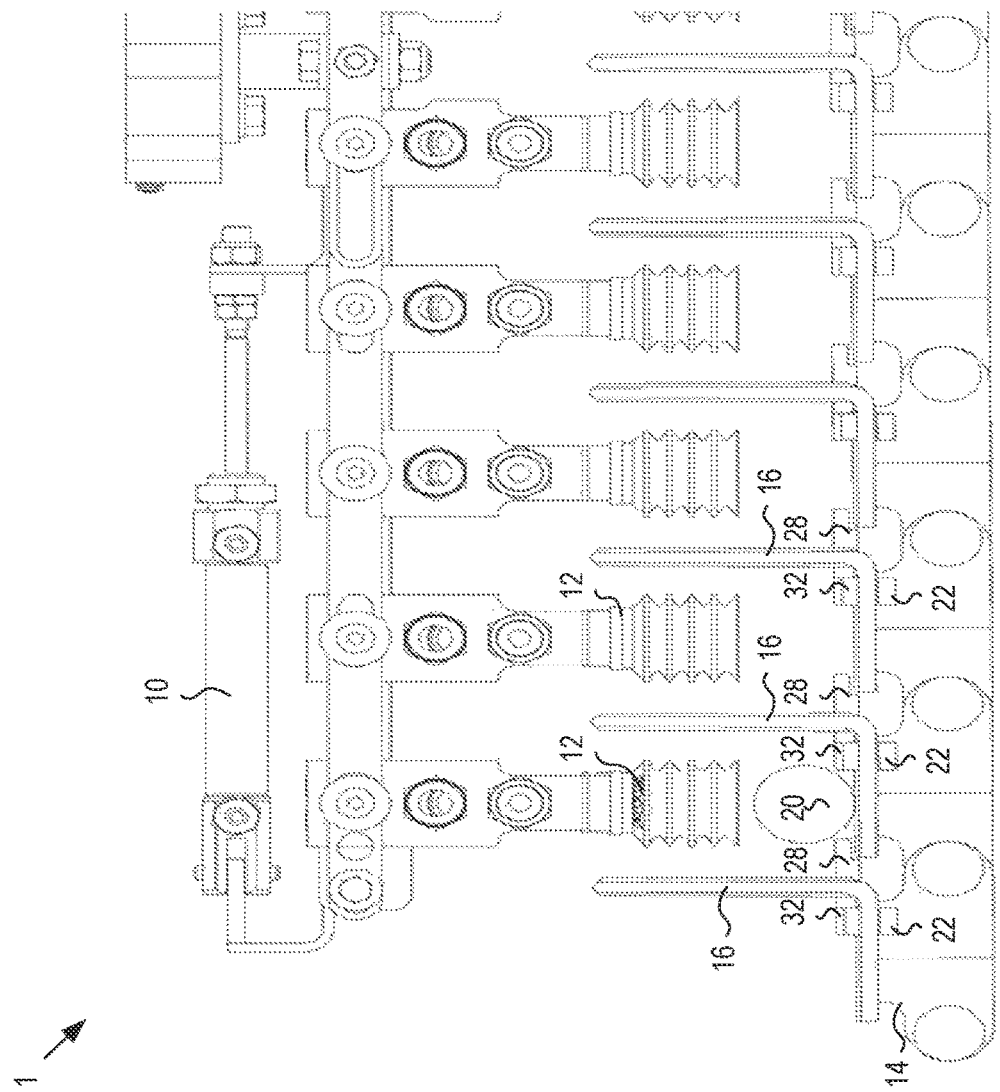
FIG. 3 illustrates a side view of a flighted conveyor with a sausage that is positioned in a center of a flight due to inserts of the present disclosure installed at sequential adjacent flights.

FIG. 3 illustrates a side view of a flighted conveyor with a sausage that is positioned centrally on a flight between two adjacent flights due to inserts of the present disclosure installed at sequential adjacent flights.

Figure 4:
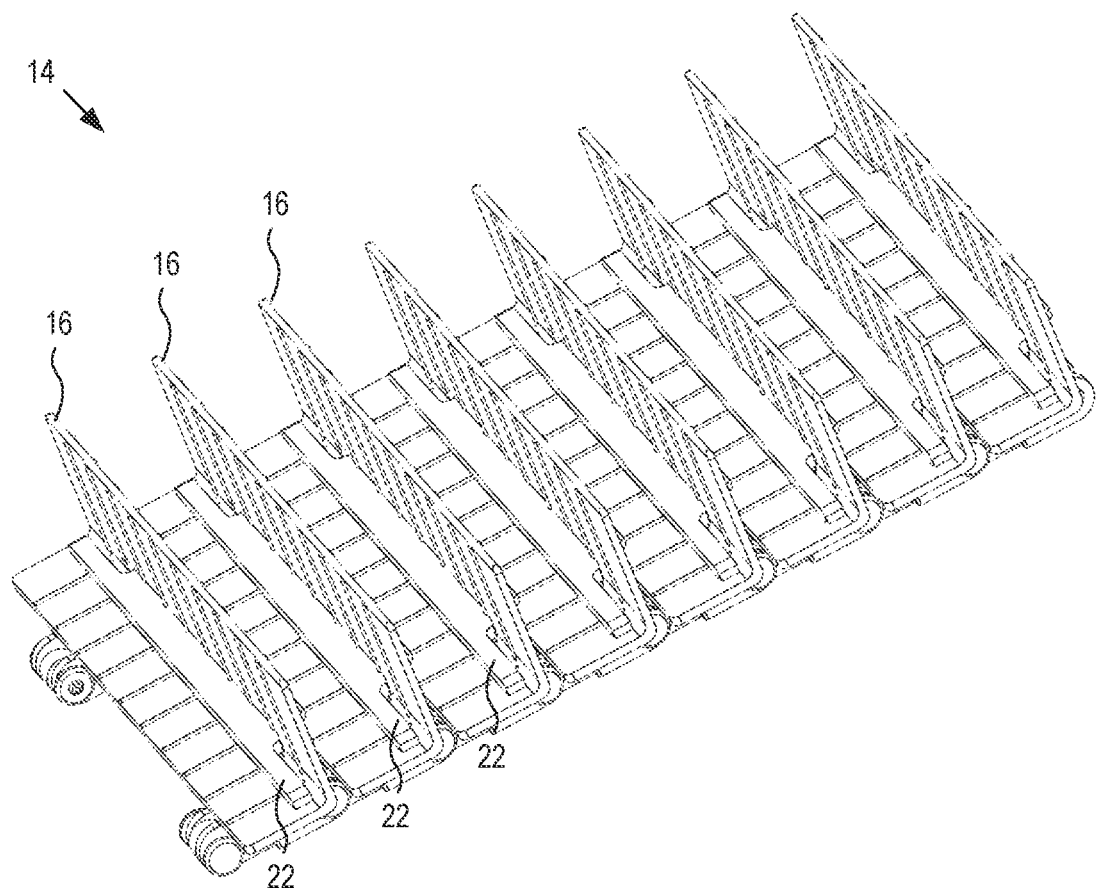
FIG. 4 illustrates a perspective view of a flighted conveyor with inserts installed at sequential adjacent flights.
Figure 5:
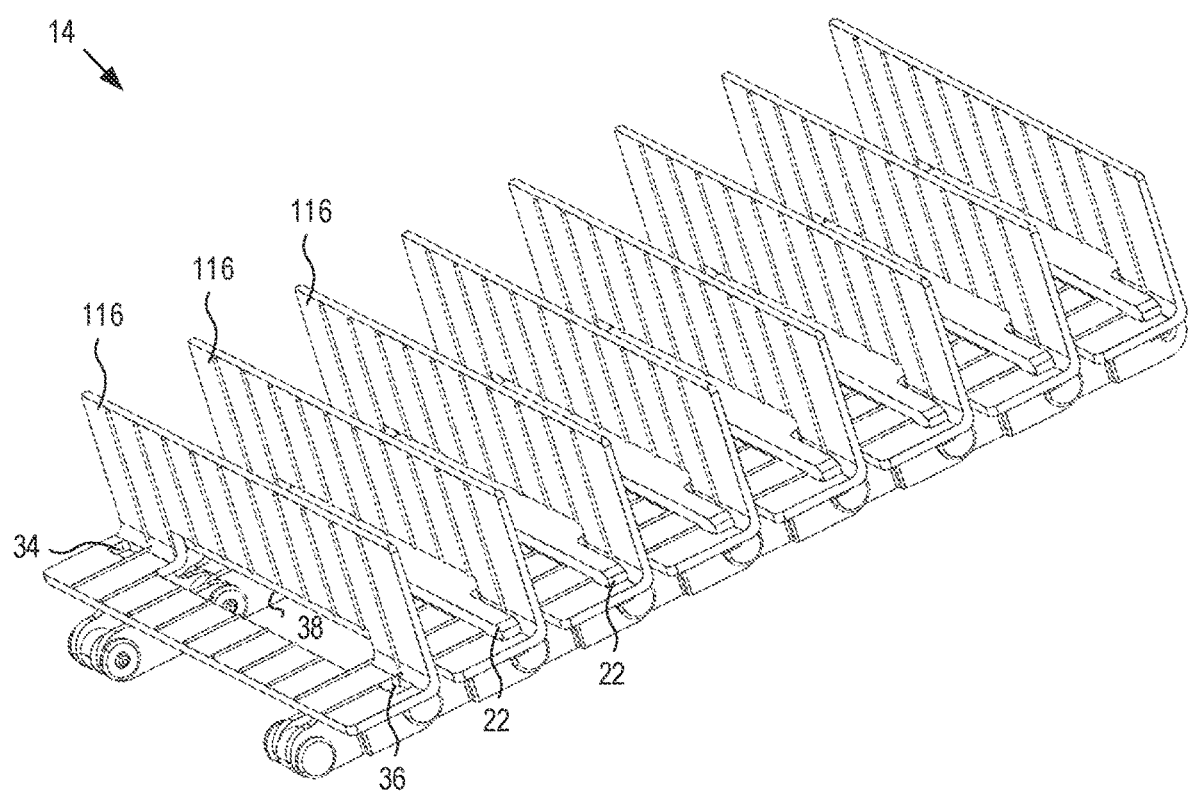
FIG. 5 illustrates a perspective view of a flighted conveyor with a first insert of the present removed from a first flight.
Figure 6:
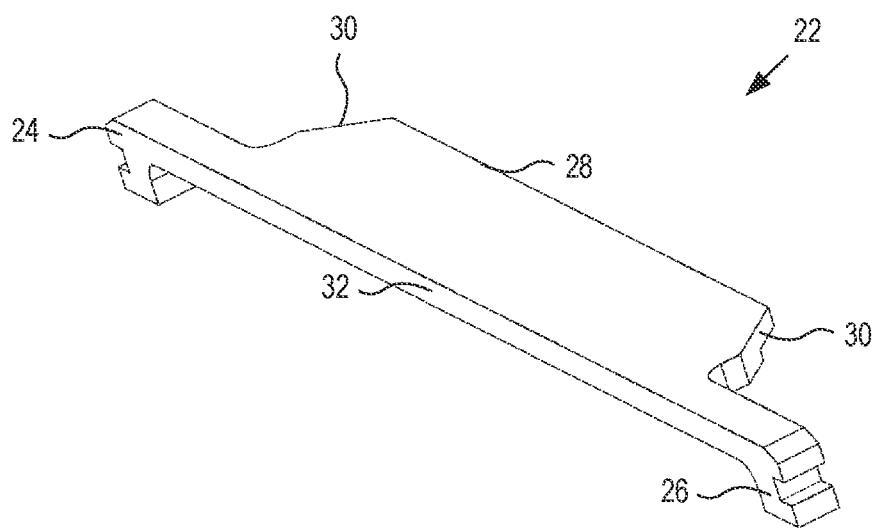
FIG. 6 illustrates a perspective view of one form of an insert according to the present disclosure.

FIG. 3 illustrates a flighted conveyor 14, such as a buck chain, having inserts 22 attached to flights 16 of bucket chain conveyor 14 that position a tubular food product 20 centrally between two adjacent flights 16. FIG. 4 illustrates is a perspective view of a flighted conveyor with inserts 22 of the present disclosure installed at sequential flights 16 of a flighted conveyor 14. FIG. 5 illustrates a perspective view of a flighted conveyor 14 with a first insert of the present removed from a first flight. FIG. 6 is a perspective view of one form of an insert 22 according to the present disclosure.

Referring to FIG. 6, each insert 22 defines a first clip 24 positioned at a first side of the insert and a second clip 26 positioned at a second side of the insert that is opposite to the first side. The first and second clips 24, 26 are configured to snap fit and attach the insert 22 to an associated flight 16 of the flighted conveyor 14. In some implementations, the flight defines first and second apertures 34, 36 to receive the first and second clips 24, 26 of the insert 22 (See FIG. 5).

In some implementations, the inserts 22 are made of a food grade polymer and have sufficient resilience to allow them to be easily snapped into a flight 16 and removed when the product size changes.

Each insert 22 defines a forward edge 28 that is configured for insertion through an aperture 38 of an associated flight 16 of the flighted conveyor 14 such that when the insert is attached to the flight, the forward edge 28 is positioned on a first side of the flight 16. In some implementations, each insert 22 may also define one or more angled edges 30 adjacent to the forward edge 28 that facilitate insertion of the insert 22 into the aperture 38 of the flight 16.

Each insert additionally defines a straight rear edge 32 that extends straight across at least part of the insert 22. The rear edge 32 is configured such that when the insert 22 is attached to the flight 16, the rear edge 32 is positioned on a second side of the flight 16 that is opposite to the first side of the flight 16. It will be appreciated that when the inserts 22 are attached to the flights 16, a barrier is present on either side of an open gap between two adjacent flights 16 that centrally positions the tubular food products 20.

Referring to FIG. 4, the inserts 22 position the food product 20 centrally underneath suctions cups 12 as the food product is positioned between the forward edge 28 of one insert 22 attached to a flight 16 and the rear edge of a second inert 22 attached to an adjacent flight 16. As a result, the food product 20 is properly positioned for allowing a vacuum seal to be created when the suction cup 12 engages the food product. This assures that the food product 20 may be removed from between adjacent flights 16 by the pick-and-place robot 10.

As discussed above, the inserts 22 are sized based upon the food product 20 being processed. The inserts 22 may be easily installed and removed due to clips 24, 26 and the resilient material used to make the inserts 22. As a result, different sized tubular food products 20 may be quickly and efficiently processed by changing the inserts 22 of the flighted conveyor 14 rather than by changing the flighted conveyor 14 altogether.

Another advantage of utilizing inserts to center tubular food product 20 between the flights 16, rather than merely pushing it to one side of the flight is seen when the robot tool 10 attempts to pick the food product 20. With the food product 20 positioned to one side of the flights 16, it is likely that the suction cup 12 will scrape against a side of the flight 16 when approaching the food product 20. The scraping may deform the suction cup 12, so that it does not reliably create a seal when the suction cup 12 comes in contact with the food product 20 and causes a missed pick.

Furthermore, the low profile of the inserts 22 also prevents the inserts 22 from interfering with a larger diameter product within the product matrix. The inserts 22 provide a universal solution for all the food products 20 in the product matrix.

Although certain embodiments and implementations of the disclosure have been specifically described herein, it will be apparent to those skilled in the art to which the disclosure pertains that variations and modifications of the various embodiments shown and described herein may be made without departing from the spirit and scope of the disclosure. Accordingly, it is intended that the disclosure be limited only to the extent required by the appended claims and the applicable rules of law.

The invention claimed is:

1. An insert for a flighted conveyor, the insert defining:
    a forward edge configured for insertion through an aperture of a flight of the flighted conveyor such that when the insert is attached to the flight, the forward edge is positioned on a first side of the flight;
    a rear edge configured such that when the insert is attached to the flight, the rear edge is positioned on a second side of the flight that is opposite to the first side of the flight;
    a first clip positioned at a first side of the insert; and
    a second clip positioned at a second side of the insert that is opposite to the first side;
    wherein the first and second clips are configured to snap fit to the flight and attach the insert to the flight of the flighted conveyor.

2. The insert of claim 1, wherein the flighted conveyor is a bucket chain conveyor.

3. The insert of claim 1, wherein the insert further defines one or more angled edges adjacent to the forward edge of the insert.

4. A flighted conveyor comprising:
a plurality of flights, the flights of the plurality of flights spaced apart from each other along the flighted conveyor;
a plurality of inserts, each insert attached to a flight of the plurality of flights, where each insert comprises:
  a forward edge configured for insertion through an aperture of a flight such that when the insert is attached to the flight, the forward edge is positioned on a first side of the flight; and
  a rear edge configured such that when the insert is attached to the flight, the rear edge is positioned on a second side of the flight that is opposite to the first side of the flight,
wherein between a first flight and a second flight of the plurality of flights that are adjacent to each other, a forward edge of an insert attached to the first flight and a rear edge of an insert attached to the second flight are positioned to substantially center a cylindrical product positioned between the first and second flights.

5. The flighted conveyor of claim 4, wherein the cylindrical product is a food product.

6. The flighted conveyor of claim 4, wherein the cylindrical product is a sausage.

7. The flighted conveyor of claim 4, wherein the flighted conveyor is a bucket chain conveyor.

8. The flighted conveyor of claim 4, wherein each insert of the plurality of inserts further defines one or more angled edges adjacent to the forward edge of the insert.

9. The flighted conveyor of claim 4, wherein each insert further defines:
  a first clip positioned at a first side of the insert; and
  a second clip positioned at a second side of the insert that is opposite to the first side;
  wherein the first and second clips are configured to snap fit to a flight of the plurality of flights.

10. The flighted conveyor of claim 4, wherein the plurality of inserts comprise a food grade polymer.

\* \* \* \* \*